Figure 1:
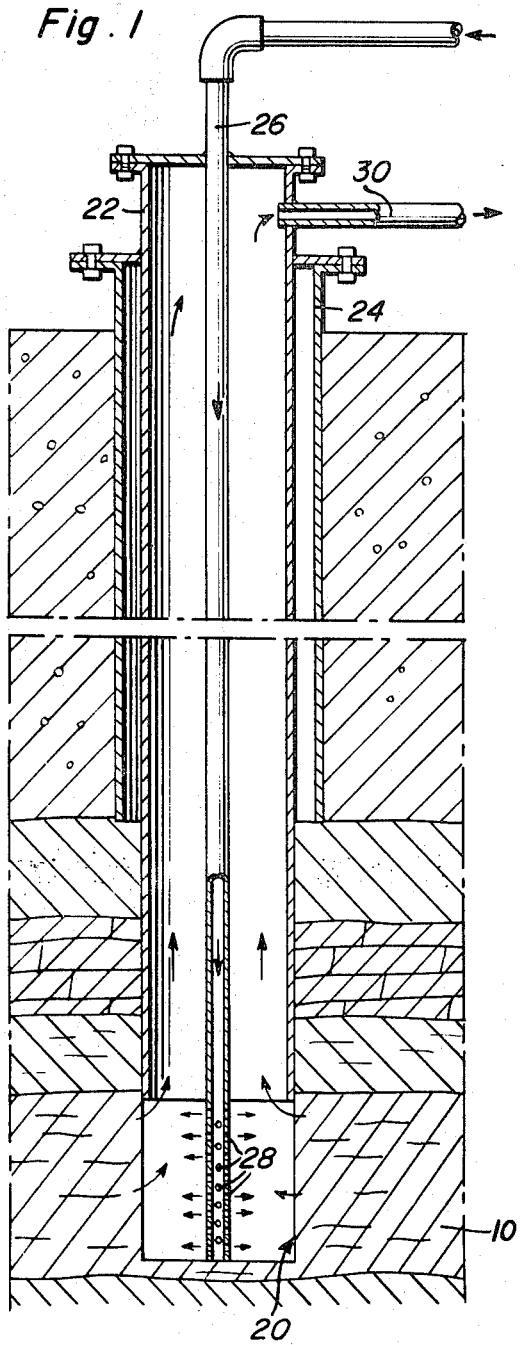

United States Patent

[11] 3,542,431

| [72] | Inventors | Clarence J. Johnson<br>923 N. 23rd St., 59101;<br>William G. Mouat, 825 Parkhill Drive,<br>Arthur G. Davidson, 2522 Howard Ave.,<br>Billings, Montana 59102 |
|---|---|---|
| [21] | Appl. No. | 809,144 |
| [22] | Filed | March 21, 1969 |
| [45] | Patented | Nov. 24, 1970 |

[54] BACTERIOLOGICAL MINING OF SULPHUR BEARING DEPOSITS
5 Claims, 2 Drawing Figs.

| [52] | U.S. Cl. | 299/5, 166/246 |
|---|---|---|
| [51] | Int. Cl. | E21b 43/22 |
| [50] | Field of Search | 166/246; 299/4, 5; 195/Exam |

[56] References Cited

UNITED STATES PATENTS

| 3,105,014 | 9/1963 | Harrison | 166/246X |
|---|---|---|---|
| 3,118,500 | 1/1964 | Maddox | 166/246 |

OTHER REFERENCES

"Bacterial Release of Oil" World Oil, Aug. 25, 1947 pages 36, 39, 40, 42, 44 and 47

*Primary Examiner*—Ernest R. Purser
*Attorneys*—Clarence A. O'Brien & Harvey B. Jacobson ABSTRACT: A method of recovering the sulphur moiety of a naturally occurring subterranean gypsum bearing stratum which comprises introducing inorganic sulphur compound metabolizing organisms into the stratum and removing sulphur in the form of hydrogen sulphide or dilute sulphuric acid.

Patented Nov. 24, 1970

3,542,431

Clarence J. Johnson
William G. Mouat
Arthur G. Davidson
INVENTORS

BY *Clarence A. O'Brien*
and *Harvey B. Jacobson*
Attorneys

BACTERIOLOGICAL MINING OF SULPHUR BEARING DEPOSITS

The present invention relates to the bacteriological mining of gypsum for the recovery of the sulfur moiety thereof. More particularly, the present invention relates to a process utilizing sulfur reducing bacteria to recover the sulfur moiety of a subterranean gypsum stratum.

With the present day need for sulfur in innumerable manufacturing processes there exists a need for the recovery of the sulfur moiety of subterranean sulfur bearing formations other than those that can be treated by the Frasch method for the recovery of the elemental sulfur contained therein. This is particularly true with regard to inorganic sulfur containing compounds specifically the naturally occurring sulfates, i.e., gypsum, frequently found as an overburden in regions having subterranean deposits of sulpur such as occurring in the caprock salt domes. However, it will be appreciated that the relatively high melting points of the aforementioned sulfates are sufficiently high so as to, for all practical purposes, preclude their recovery by a "Frasch" process.

It is an object of the present invention to provide a relatively simple process for the bacteriological leaching of gypsum and other sulfate deposits for the recovery of the sulfur moiety thereof.

It is another object of the present invention to provide particular means for enhancing the action of sulfate reducing bacteria in both wet and dry subterranean sulfate deposits for the initial recovery of the sulfur moiety thereof in the form of hydrogen sulfide or weak sulfuric acid.

In accordance with the foregoing objects the present invention contemplates the utilization of inorganic sulfur compound metabolizing organisms, primarily those which reduce sulfates to hydrogen sulfide, but not excluding those organisms which in their metabolism utilize inorganic sulfur containing compounds and may for example exist in a symbiotic relationship with sulfate reducing organisms or even oxidized sulfur bearing compounds to sulfuric acid.

Figure 2:
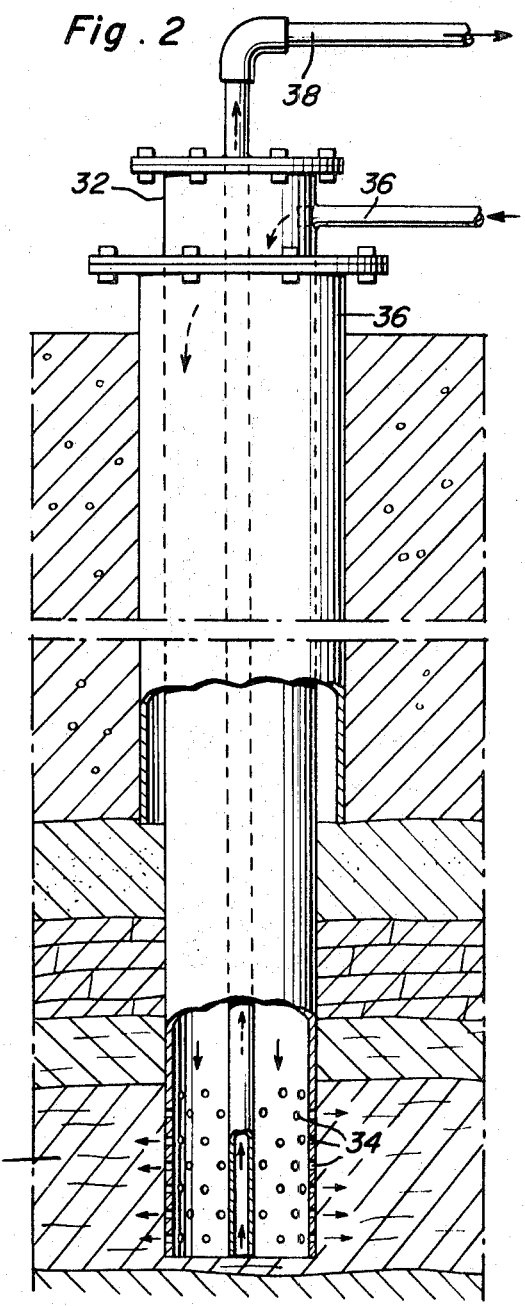

Further objects and aspects of the present invention will become more apparent from a more detailed description of the invention following hereinafter and the drawings forming a part hereof wherein:

FIG. 1 is a vertical cross-sectional view of a borehole completion for the in situ bacteriological mining of a dry sulfate containing stratum; and FIG. 2 is a vertical cross-sectional view of a borehole completion for the in situ bacteriological mining of a wet sulfate containing stratum.

Briefly, the objects of the present invention are realized by the utilization of sulfate reducing and oxidizing bacteria which are inoculated in a particular manner into a cased or hole drilled through an overburden into a gypsum stratum. The inoculate utilized can be derived from sources other than pure or mixed cultures per se, and it will be appreciated that material such as raw sewage, decaying organic matter, as well as numerous other substances sulfate reducing oxidizing bacteria present therein can be utilized as well as hydrogen sulfide saturated water derived from a previously drilled borehole, such as is provided in carrying forth the present invention, wherein such organisms are present. In this regard, it will be appreciated that organisms of the Order Eubacteriales, Family Pseudomonadaceae, Family Bacillaceae as represented by the Genus Desulfovibrio and Genus Clostridium, respectively, as well as organisms of the Order Chlamydobacteriales, Family Beggiatoaceae, for example, can be utilized in accordance with the present invention for the in situ bacteriological mining of sulfur bearing deposits as exemplified by the several naturally occurring forms of gypsum. In this regard, more specifically, exemplary of sulfate reducing organisms is D. desulfuricans and representative of the sulfur oxidizing organisms is a member of the thiobacilleae tribe Genus Thiobacillus, specifically T. thioparus which in their metabolism oxidized sulfur to sulfate. From the foregoing it will be appreciated that the initial inoculation into the gypsum stratum does not necessarily contemplate the introduction of a specific strain, i.e. pure culture. Furthermore, the minimum amount of inoculant required as a practical matter, would be the quantity necessary to saturate the "underground culture chamber", and the nature and minimum amount of nutrient require, such as may be necessary in addition to the gypsum nutrient present, will generally vary from about 4 percent to 8 percent of the volume of the liquid in the gypsum stratum, but in the case of sewage or other organic wastes, the quantity of nutrient present in such inoculant would generally be found to be adequate. As to other culture parameters it will be appreciated that the organisms in question are capable of actively carrying forth the processes at the temperatures normally encountered in the subterranean gypsum deposits. Therefore, the temperature modification in the stratum is generally not necessary.

Referring now more specifically to FIG. 1 which is exemplary of a completion with respect to the bacteriological mining of a dried gypsum stratum 10 a hole 20 would be drilled substantially through the gypsum formation 10. The hole 20 would be cased as by the casing 22 from the surface to the top of the gypsum bearing formation 10 in FIG. 1 it will also be noted that a larger diameter casing 24 is utilized to generally preclude the introduction of surface water into the borehole. Furthermore, it will be seen that a pipe string 26, of substantially smaller diameter than the casing 22 is provided with pipe string 26 projects downwardly into the gypsum bearing formation 10 and is perforated as at 28 for the introduction of inoculant and nutrient, the flow of which is indicated by the arrows emerging from the pipe string 26. Inasmuch as the action of the organisms utilized is primarily anaerobic and in the case of a completion as shown in FIG. 1, the sulfur moiety of the gypsum bearing formation 10 is generally recovered in the form of hydrogen sulfide, the upper portion of the casing 22 would normally be capped and an offtake conduit 30 provided in communication with the interior casing 22 for the offtake of hydrogen sulfide gas as indicated by the ascending arrows within the casing 22. In can be appreciated of course that the hydrogen sulfide gas can be treated by known means for the recovery of the sulfur moiety the thereof in the form of elemental sulfur if desired.

With specific regard to the completion illustrated in FIG. 2 it will be understood that the gypsum bearing formation 10 illustrated therein is wet and to effect bacteriological mining of the sulfur moiety thereof a borehole is drilled substantially through the gypsum bearing formation 10 and a casing 32, perforated adjacent the lower end thereof within the gypsum bearing stratum as at 34 would be provided and the borehole cased for the exclusion of surface water as at 36. In addition, when carrying forth the present process with a wet gypsum stratum inoculant and nutrient is introduced into the casing 32 through and above surface conduit 36 communicating with the interior of the casing 32 and a pipe string 38 projecting to within the stratum 10 serves as a pump line to extract the sulfur from the formation in the form of weak sulfuric acid or hydrogen sulfide.

From the foregoing, it will be readily apparent that the conditions, or parameters, of carrying forth the present process are highly variable and that with the foregoing nature of the inoculate in mind, a viable culture condition would be maintained by the appropriate introduction of supplemental nutrients, i.e. magnesium sulfate, ammonium phosphate, ammonium nitrate, potassium nitrate, sodium sulfate, etc., in addition to the primary nutrients, i.e. the sulfates present in the natural formation. While the culture conditions are generally anaerobic, the process does not preclude aerobic conditions, however, under anaerobic conditions it may be necessary to monitor or control the redox potentials. Form experience, it has been found that pH in the subterranean culture chamber can vary widely as from approximately 2.0 to 8.5, for example. The minimum of inoculant required, as indicated briefly above, is generally of a quantity necessary to initially saturate the underground culture chamber as in the case of completion of FIG. 1, for example, or maintain the saturated condition of the subterranean culture chamber as in the completion shown in FIG. 2 of the drawings, for example.

From the foregoing, it can be appreciated that a relatively simple process is provided for the in situ bacteriological mining of gypsum and the like, for the recovery of the sulfur moiety thereof.

The foregoing is considered as illustrative only of the principles of the invention. Further, since numerous modifications and changes will readily occur to those skilled in the art, it is not desired to limit the invention to th exact method, operation and product shown and described, and accordingly all suitable modifications and equivalents may be resorted to, falling within the scope of the invention.

We claim:

1. The process of bacteriologically recovering the sulfur moiety of a subterranean gypsum bearing stratum which comprises boring through the overlying stratum and into the gypsum stratum, casing the borehole between the ground surface and the gypsum stratum, inoculating the gypsum stratum with inorganic sulfur compound metabolizing bacterial organisms and withdrawing the hydrogen sulfide sulfuric sulphuric acid resulting from the metabolism of said organisms to recover the sulfur moiety of the subterranean gypsum bearing stratum.

2. The process of claim 1 wherein the subterranean gypsum bearing stratum is dry and the casing extends between the surface and the top of the gypsum bearing stratum and the inoculant is introduced through a pipe string projecting downwardly to within the gypsum bearing stratum, and the products of metabolism are withdrawn from the above surface portion of the casing.

3. The process of claim 1 wherein the subterranean gypsum bearing stratum is wet and the casing extends from above the surface to substantially within the gypsum bearing stratum, which casing is perforate contiguous with the gypsum bearing stratum, and inoculant nutrients are introduced into the casing through a conduit communicating with the above surface portion of the casing and the products of metabolism are recovered through a conduit extending from above surface to substantially within the casing contiguous with the gypsum bearing stratum.

4. The process of claim 1 wherein the inoculant comprises raw sewage.

5. The process of claim 1 wherein the inoculant comprises a culture including organism D. desulfuricans.